(12) United States Patent
Grabau et al.

(10) Patent No.: US 8,849,803 B2
(45) Date of Patent: Sep. 30, 2014

(54) DATA COLLECTION FOR USAGE BASED INSURANCE

(75) Inventors: Mark Ryan Grabau, Westerville, OH (US); Sayed Yousef Hashimi, Pittsburgh, PA (US); Zakeer Rahman Shaik, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/285,059

(22) Filed: Oct. 31, 2011

(65) Prior Publication Data

US 2013/0110867 A1    May 2, 2013

(51) Int. Cl.
| | | |
|---|---|---|
| G06F 17/30 | (2006.01) | |
| G06F 7/00 | (2006.01) | |
| G06Q 40/08 | (2012.01) | |

(52) U.S. Cl.
CPC ..................................... *G06Q 40/08* (2013.01)
USPC ........................................................ 707/722

(58) Field of Classification Search
CPC .......... G06Q 30/0204; G06Q 30/0283; G06Q 30/0201; G06Q 30/0203; G06Q 30/0241; G06Q 30/0273; G06Q 30/0276; G06Q 30/0278; G06Q 30/0282; G06F 17/00; G06F 17/30256; G06F 17/30867
USPC ........................................................ 707/769
See application file for complete search history.

(56) References Cited

U.S. PATENT DOCUMENTS

| | | | |
|---|---|---|---|
| 5,797,134 | A | 8/1998 | McMillan et al. |
| 6,064,970 | A | 5/2000 | McMillan et al. |
| 6,438,472 | B1 * | 8/2002 | Tano et al. ................... 701/29.6 |
| 6,868,386 | B1 | 3/2005 | Henderson et al. |
| 7,010,289 | B2 | 3/2006 | Jijina et al. |
| 7,702,690 | B2 | 4/2010 | Brave et al. |
| 7,865,378 | B2 | 1/2011 | Gay |
| 7,937,278 | B1 | 5/2011 | Cripe et al. |
| 2007/0257781 | A1 * | 11/2007 | Denson ...................... 340/425.5 |
| 2008/0174485 | A1 * | 7/2008 | Carani et al. ............. 342/357.07 |
| 2009/0051510 | A1 * | 2/2009 | Follmer et al. ............ 340/425.5 |
| 2010/0191370 | A1 * | 7/2010 | Barragan Trevino et al. 700/244 |
| 2011/0125363 | A1 | 5/2011 | Blumer et al. |

FOREIGN PATENT DOCUMENTS

| | | |
|---|---|---|
| AU | 200138914 | 6/2003 |
| EP | 1909231 | 4/2008 |
| GB | 2434346 | 7/2007 |
| JP | 2010268279 | 11/2010 |
| WO | 2010/062899 | 6/2010 |

* cited by examiner

*Primary Examiner* — Kuen Lu
(74) *Attorney, Agent, or Firm* — Whitham, Curtis, Christofferson & Cook, P.C.; John R. Pivnichny (57) ABSTRACT

Large amounts of data resulting from periodic sampling and capture of data corresponding to variable operational parameters of one or more systems, such as a plurality of vehicles, and stored in a large number of rows of data corresponding to the number of captured samples are summarized in an analytically meaningful way by simply counting the instances of particular values of the operational parameters of interest in the form of a histogram and stored as a single row of data. The reduction in number of rows of data allows acceleration of processing of later queries by a factor of one thousand (assuming an average trip length of ten minutes) or more.

20 Claims, 4 Drawing Sheets

Figure 4C

DATA COLLECTION FOR USAGE BASED INSURANCE

FIELD OF THE INVENTION

The present invention generally relates to usage based insurance and, more particularly to the collection and summarization in an analytically meaningful way of fine-grained usage information in regard to operation of vehicles such as automobiles and trucks or, potentially, watercraft and aircraft, so that further analyses and inquiries can be rapidly performed in order to develop pricing schedules and strategies that accurately reflect actuarial risks associated with a vehicle and operators of the vehicle.

BACKGROUND OF THE INVENTION

Automobiles and other types of vehicles used for transportation are usually regarded as essential to many activities for a large proportion of the population and have usually represented substantial capital expense. Since such vehicles are subject to damage or destruction and may cause personal injury and/or property damage during events that are largely unpredictable, they have been objects of insurance against the economic loss and cost of such damage or liability. Most jurisdictions in the United States and many foreign countries require liability insurance as an incident of licensing for operation of such vehicles while many vehicles are financed and insurance against the cost of damage to the vehicle, itself, is generally required as an incident of such financing or simply to provide for replacement of the vehicle such that a user may have substantially uninterrupted use of a conveyance adequate to their needs.

The development of many technologies such as arrays of air bags and computerized engine regulation, light weight and/or impact absorbing materials and parts and exhaust gas treatment which support enhanced safety and reduced environmental impact of the use of such vehicles have recently become available and the inclusion of such technologies in currently produced vehicles has been mandated in the United States and elsewhere while their inclusion has often raised the cost of vehicles to a significant degree. Any such increase in cost, of course, increases the potential liability of the insurer and insurance premiums based principally on vehicle cost have increased accordingly to the point of compromising the ability of some vehicle users to procure and maintain adequate insurance. Therefore, insurance providers have sought to potentially reduce premiums based on the driving records of users and prior insurance claims. However, driving records can contain only historical information and are usually insufficiently complete to accurately reflect the driving habits of particular vehicle users and thus may not accurately predict actual driving habits or the increase or reduction of actuarial risk to insurers.

In an effort to obtain more current information from which driving habits can be assessed in regard to risk of accidents or insurer liability under an insurance policy, several systems have been proposed to collect information concerning operation of respective vehicles on a substantially real-time basis. Such information can then be analyzed to allow a more accurate assessment of driving habits and the relative risks of insurer liability that may be projected from such driving habits. Many, if not most, of the arrangements that have been proposed to perform such a function provide for collection of information only upon the occurrence of events such as excessive longitudinal or lateral acceleration that are perceived to be correlated with a risk of insurer liability and are, hence, very coarse-grained in the information provided. Further, generation of events that cause reportage may not accurately reflect the true risk incident to particular qualities of individual driving habits and, moreover, may not allow such information to be optimally current. Unfortunately, increasing currency or making collected data more fine-grained by altering thresholds of vehicle operation condition events which will cause an event to be reported carries a large cost in number of vehicle operating conditions reported and transmitted as well as in storage and processing of increased amounts of collected vehicle operating condition data. Further, such increased volume of collected data due to alteration of reporting thresholds will be incrementally less and less correlated with the risk of insurer liability.

SUMMARY OF THE INVENTION

It is therefore an object of the present invention to provide a system and method for collecting data which is arbitrarily fine-grained and current while providing for summarizing of such data in an analytically meaningful way to avoid significant costs of storage of data and processing time to support accurate assessments of liability of risk to an insurer and pricing of usage based insurance.

In order to accomplish these and other objects of the invention, a method of summarizing data is provided comprising steps of capturing data representing reports of at least one operating condition of at least one system during a period of operation to form captured data, the reports being represented in respective rows of data, assigning a value to each possible reportable value of at least one variable parameter of the operating condition, counting a number of occurrences of each value in the captured data to produce counts of respective values for the variable parameter of the at least one operating condition, forming a histogram of the counts, and representing the histogram in fewer rows of data than said rows of data in which the reports are represented.

In accordance with another aspect of the invention, apparatus for summarizing data is provided including at least one sensor to capture values of at least one variable operating parameter of a system as respective rows of data, a memory to store values of at least one variable operating parameter over a period of operation of the system, a processor for evaluating the values stored in the memory to determine if the period of operation of said system is valid or exceptional and, if said values for the period of operation are determined to be valid, counting captured values of the variable operating parameter having respective values during the period of operation, and storage to store results of the counting by the processor as fewer rows of data than the respective rows of data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
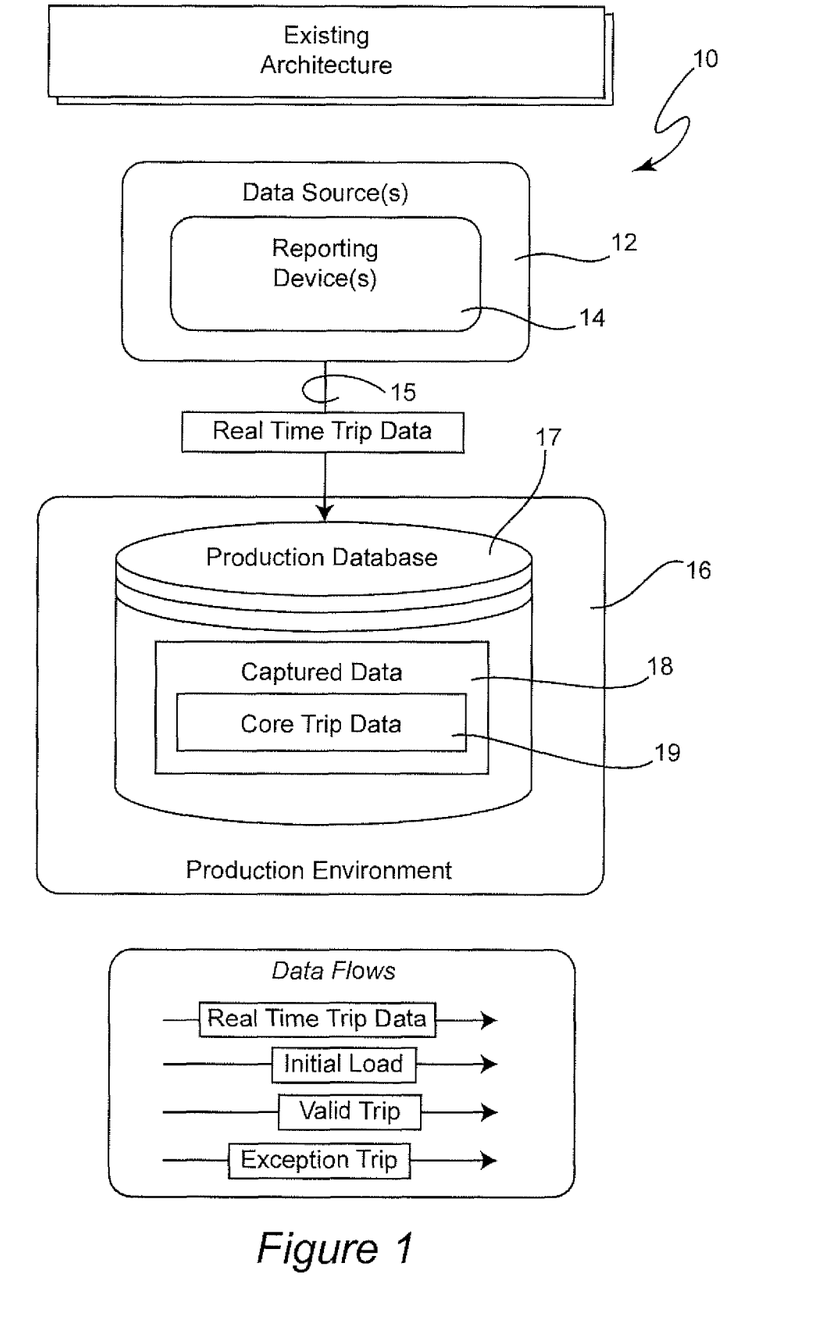
FIG. 1 is a schematic diagram of the architecture of operation condition sensing provided in most vehicles of current design and manufacture.

Referring now to the drawings, and more particularly to FIG. 1, there is schematically shown the currently existing architecture for operation condition sensing and reportage provided in most vehicles of current design and manufacture. However, since FIG. 1 is arranged schematically and to facilitate an understanding of the basic principles of the invention, no portion of FIG. 1 (or FIG. 3 in which FIG. 1 is replicated) is admitted to be prior art in regard to the present invention. Further, many types of apparatus and sensors may be employed of either known or foreseeable design and constitution of the various operational elements depicted in FIG. 1 which may be employed in connection with the invention and are intended to be collectively represented in FIG. 1. The principal purpose of FIG. 1 is to convey an understanding of the existing potential for collection of data in regard to operational conditions of a given vehicle and that the invention does not require modification thereof other than the optional addition of data storage capacity and data processing capacity to provide substantial meritorious effects in providing usage based insurance (UBI), sometimes referred to as pay as you drive (PAYD) insurance, and the determination of insurance premiums that can be minimized consistent with suitable insurer profitability and security for the insured.

As shown in FIG. 1, the existing vehicle operation condition data collection architecture 10 comprises an arbitrary number of sensor devices for collecting real time vehicle operation condition data which, as a minimum, include speed sensors and lateral acceleration sensors 12 serving as sources for corresponding data and from which additional relevant data can be derived if not directly sensed. Samples of the outputs of these sensors are preferably captured once each second (in real time) of vehicle operation by one or more reporting devices 14 capable of sensing and making reports of (and, generally, temporarily storing) instantaneous values of vehicle condition or operating parameters.

Reporting device(s) 14 preferably collect and report vehicle identification number (VIN), time of day, vehicle speed, and accelerometer data (preferably both longitudinally and laterally of the vehicle) in order to determine the number of miles driven, speed, number of sudden accelerations or decelerations or sharp turns and the like by the vehicle in the course of a trip or over an arbitrary course and period of time. Current reporting devices do not currently include global positioning system (GPS) technology but such technology is preferable and can easily be included at relatively low cost in individual vehicles if not already provided as an option often preferred by consumers.

A relatively small number of these samples covering, for example, thirty seconds to one minute are often retained locally in the reporting device(s) and have been used in accident investigations and reconstructions in much the same manner as the far more complex so-called "black boxes" generally required on commercial aircraft for accident reconstruction and failure analysis. The retained samples are overwritten as necessary during vehicle operation such that the operational conditions during the most recent short period of vehicle operation may be determined therefrom. Such storage may be entirely sufficient for the successful practice of the invention, depending on how often captured data can be transferred to storage having greater capacity, generally at a fixed or "landed" facility. If captured data is transferred less frequently, additional storage in the vehicle can be easily provided, as alluded to above. Further, since processing in accordance with the invention, as will be described in greater detail below, is quite simple, similar processing can easily be provided in the vehicle at relatively low cost; allowing transmission to larger, landed facilities to be much less frequent. Nevertheless, no modification of data collection infrastructure currently provided in automobiles and some other types of vehicles is required for successful practice of the invention in accordance with its basic principles.

The real time samples collected by the reporting device(s) are also preferably transferred in real time or in bursts, as depicted at 15 of FIG. 1, to a production environment 16 which includes a production database 17. The production database 17 contains archivally stored reported data 18 and, after processing into discrete trips or other segments made by the vehicle, core trip data 19. The production database can be maintained in the vehicle much in the manner of the storage of a short period of samples alluded to above but preferably is maintained in one or more stationary facilities where storage of massive amounts of data can be archivally stored at much reduced cost and with greater security.

Figure 3:
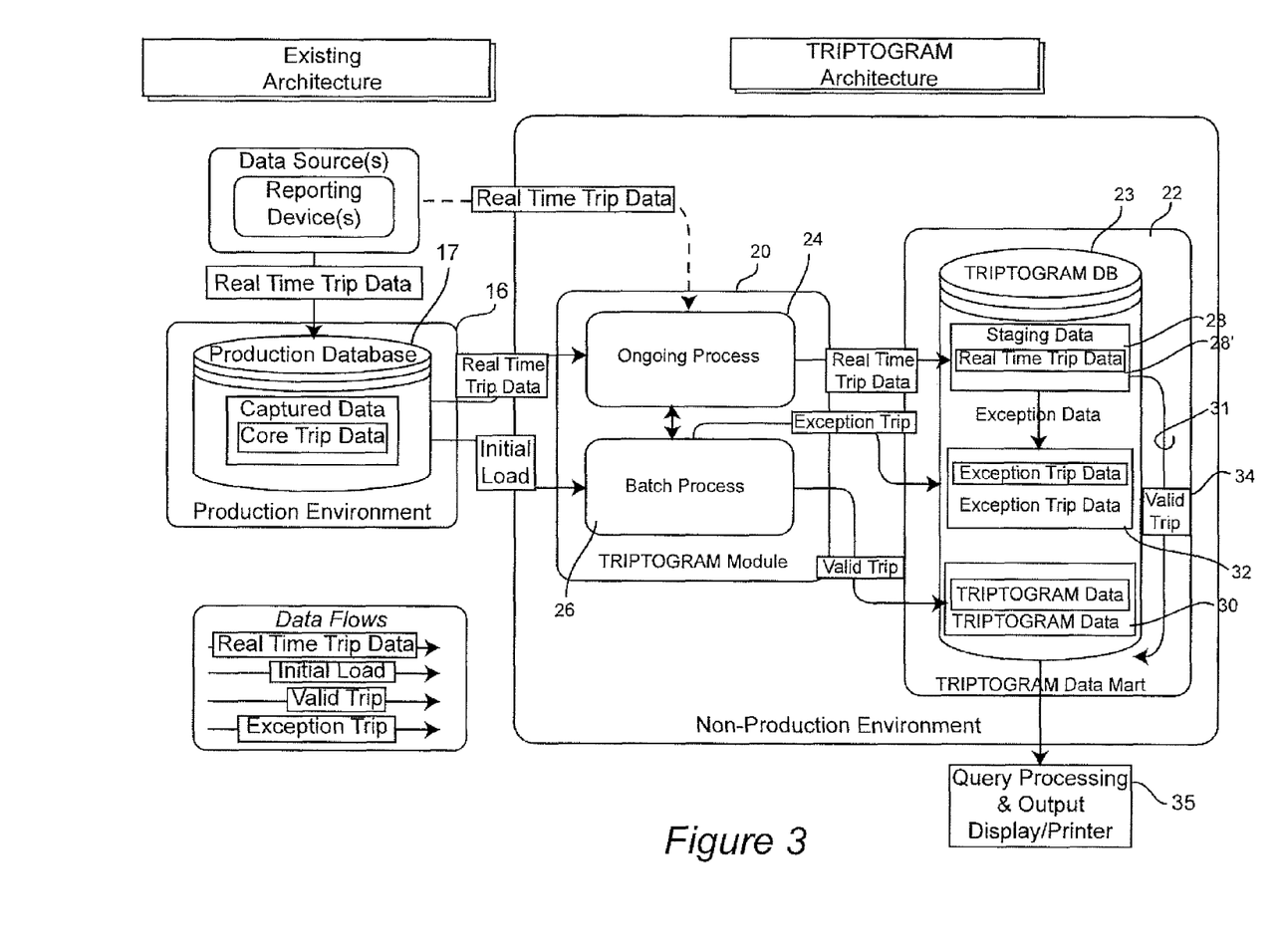
FIG. 3 is a schematic diagram of the overall system architecture in accordance with the invention particularly indicating the interaction of the architectures illustrated in FIGS. 1 and 2, and FIGS. 4A, 4B and 4C illustrate exemplary histograms as developed by and for data summarization in accordance with the invention and which are useful for conveying an understanding of the determination of insurer risk therefrom.

It should be appreciated, however, that at even this basic level, the existing architecture forming the environment of the present invention fundamentally differs from previously proposed arrangements for supporting usage based insurance since all data sampled is stored rather than only data corresponding to events where, for example, operating conditions exceeding particular threshold values are retained. While storage of all reporting data (against which all data processing operations are performed) allows the data, as subsequently processed, to be arbitrarily current and fine-grained (the fineness of data granularity can be arbitrarily increased by increasing the sampling frequency), the volume of data is greatly increased, potentially far beyond the increase in data volume that would be produced by alteration of thresholds for discriminating events to be reported. On the other hand, the selective reportage of events, however the reportage thresholds may be set, necessarily discards substantial amounts of data which could potentially contain information important to the accuracy of determination of characteristics of vehicle usage. Further, the data collected may be significantly multiplied by processing in the course of storage. That is, as also shown in FIGS. 1 and 3, the data flows for storage include an initial load of reported data, real time trip data which comprises reported data articulated into segments, preferably corresponding to individual trips, data corresponding to valid trips and data corresponding to exceptional trips. As such terminology is used hereinafter, "exceptional trips" are those instances of operation of a vehicle which do not result in the collection of any data relevant to anticipated inquiries for data of interest to a particular purpose. For example, to support determination of appropriate UBI insurance premiums, an exceptional trip would be an instance of operation of a vehicle during which no significant motion of the vehicle took place such as warming up of the vehicle in cold weather or the periodic starting of a seldom-used vehicle to cause circulation of fluids (e.g. lubricants, coolants, corrosion inhibitors, refrigerants and the like) or even altering the parked position of a vehicle within the confines of a service area, driveway or private parking lot. Optionally, data corresponding to such periods of operation can be discarded or otherwise distinguished from the remainder of an otherwise valid trip, such as running the vehicle engine for a period of time before the vehicle is moved or after reaching a final destination.

To appreciate the magnitude of the volume of data collected in accordance with the architecture of FIG. 1, it should be realized that each individual vehicle from which data is collected in this manner will produce sixty rows of collected data for each minute of operation. This data collection rate will generate six hundred rows of data for a ten minute long trip. An average commute duration in California of twenty-six minutes will produce one thousand five hundred sixty rows of data. Given the number of vehicles insured by a given insurer and typical average trip duration for each insured vehicle, a conservative estimate of rows of data collected per day for an insurer is approximately four hundred million rows of data. (It should be appreciated in this regard that collecting and storing raw data as rows is, as a practical matter, necessary in view of the need to collect data concurrently from many vehicles and the need to be able, at a later time, to analyze the data in regard to individual vehicles. At the same time, it should be recognized that processing speed is limited by the number of rows that can be accessed from memory and processed rather than the amount of information, in bits, that is represented in a given row of collected data.) However, it should be appreciated that collection of less data, such as transmitting data only when certain events are detected, necessarily excludes data that may be significant to usage based insurance rates/premiums and compromises both granularity and currency of data as well as allowing for important characteristics of vehicle operation to be obscured or incorrectly evaluated.

For example, the insurer is interested in actual speed of the vehicle as well as the change in vehicle speed from one sample to the next. Other parameters of substantial interest to insurers is sometimes referred to as "squigglies" which, for any parameter such as speed or longitudinal or lateral acceleration, is a measure of how erratic (e.g. frequent hard acceleration or braking, sharp turns or swerving) the operation of the vehicle may have been. Such data is substantially discarded in the absence of substantially continuous collection of operating condition data as is the case in operational data collection arrangements prior to the present invention.

Since, as alluded to above, processing time for a given processor is a function of the number of rows of data accessed and processed rather than the amount of data, in bits, in a given row of data, the depth of data which must be collected in order to support determination of such parameters is thus so great as to compromise the ability to perform computer analyses of collected data in hours or even days for a single operational parameter for a single vehicle, such as the number of instances of hard braking during a given trip or period of time or the percentage of times the vehicle was operated during times or in locations where traffic congestion would be expected. Four hundred million rows of data (corresponding to the above conservative estimate) collected per day corresponds to one hundred forty-six billion rows of data per year, a typical period for analysis for insurance rate/premium determination for usage based insurance. Microsoft Access™ running on a laptop (for which the cost of processing can be considered to be negligible for short periods of time) is capable of processing one million rows of data in 80 seconds; thus requiring 135.2 days for processing one year of data samples which is certainly non-negligible in cost. Even assuming that other applications such as Oracle™ running on a server may achieve processing speed two hundred times greater than Microsoft Access™ running on a laptop, sixteen hours of server processing time is still required for such a quantity of data rows which also corresponds to substantial cost. A similar processing time and latency with corresponding costs will thus necessarily be incurred for any inquiry that may be made and which must be answered from data remaining, as collected, in such a large number of rows. Thus, the volume of data, in rows, due to necessary mechanisms of data collection remains so great as to compromise further processing for analysis of the data for setting of rates/premiums for individual vehicles and operators thereof.

Figure 2:
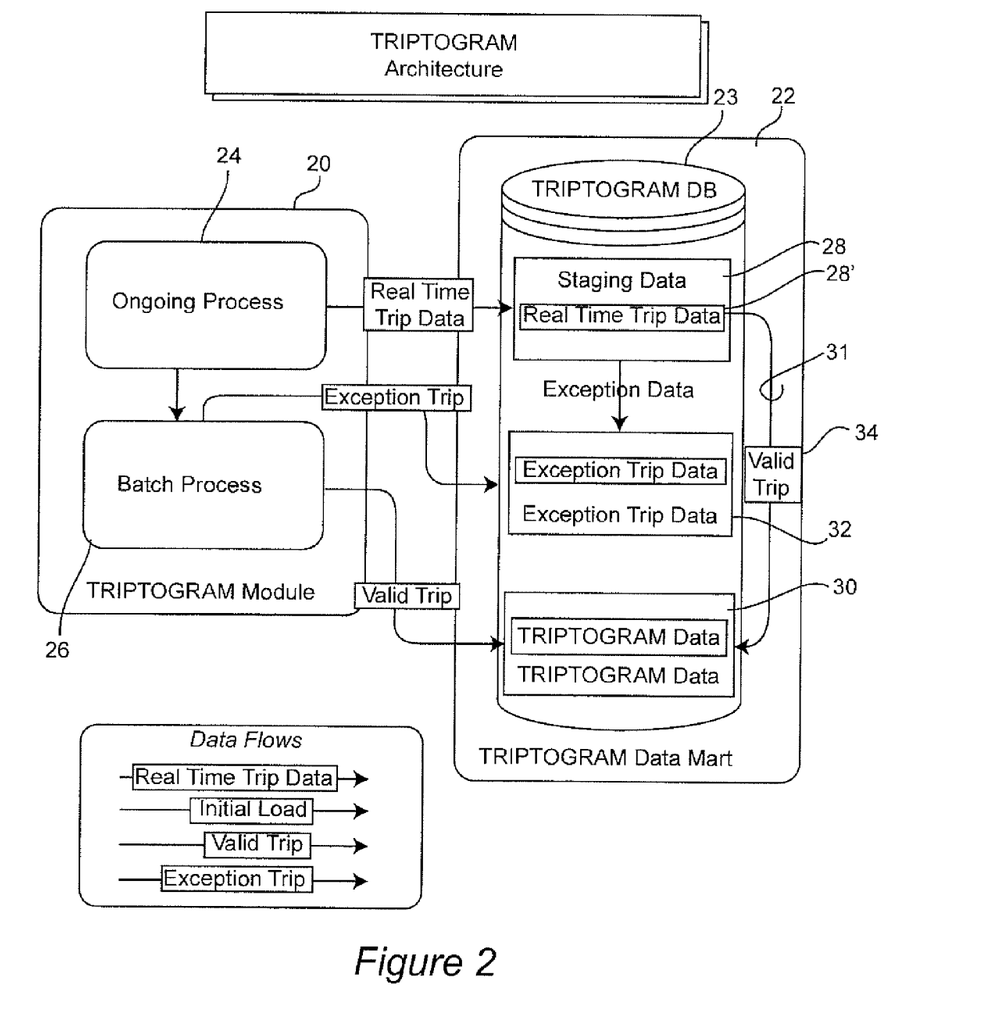
FIG. 2 is a schematic diagram of the architecture for collecting and processing data that can be collected from the existing data regarding operation condition that can be reported by the architecture of FIG. 1 in accordance with the invention.

Referring now to FIG. 2, the processing architecture for data summarization in accordance with the invention will now be discussed. The overall combination of functional elements illustrated in FIG. 2 may be collectively referred to hereinafter as a "Triptogram architecture" since it effectively reduces all sampled data corresponding to a single trip by a given vehicle to a single row of data representing one or more histograms that reflect all data collected for a given trip. It should be appreciated that, within an arbitrarily fine resolution of the samples, themselves, the data summarization provided in accordance with the invention is lossless even though the degree of data reduction as a function of rows of data as well as the number of bits required to represent data of interest is very great.

It should be kept in mind during the following discussion that the goal of the data summarization provided by the invention is principally to reduce the number of rows of data correlated with respective vehicles in order to accelerate further subsequent processing and analysis rather than, principally, to reduce the number of bits of data to allow more information to be transmitted within a limited bandwidth or stored in a storage medium of limited capacity as is the goal of many other well-known techniques of data compression such as the PEG standard for image data. Nevertheless, the number of bits required to represent data of interest is also minimized for a given degree of resolution of values of various parameters. In the present preferred application of the invention (although the data summarization and reduction of number of rows of data provided by the invention is certainly applicable to concurrently monitoring large numbers of data of any type of system) the transmission of samples is generally quite short in terms of number of bits even though each sample will be individually identified with a vehicle identification number (VIN), time stamps, a trip identifier and preferably operator identification which can result in a large number of bits for each sample that do not directly relate to vehicle operating conditions and may be greatly multiplied over the course of a trip. For the preferred application to monitoring of vehicle operating conditions in regard to usage based insurance, the transmissions from the vehicle for a single sample in accordance with the invention will usually and preferably contain the vehicle identification number (VIN), a trip identification number, start and stop dates and times, speed, change in speed, lateral acceleration (G-force) and steering angle although other parameters of interest could be easily and similarly included, as well.

This very limited amount of information can be contained within a relatively small number of bits even if no special coding is applied. On the other hand, a particular coding technique that will be discussed in detail below can not only greatly reduce the number of bits in a given transmission of reported data from a given vehicle, but greatly simplify and accelerate processing to minimize the number of rows of data while placing the data in a form that can be directly evaluated for a given trip or be aggregated for evaluation by relatively simple and rapidly executed additional processing.

As shown in FIG. 2 (and FIG. 3 in which FIG. 2 is replicated in combination with the structure shown in FIG. 1), the Triptogram module 20 receives real time (or substantially real time) reporting data from the existing data collection infrastructure discussed above in connection with FIG. 1 and will create valid or invalid/exceptional Triptogram records which can be stored in a database. Since this data may have substantial commercial value, the database may be considered as a data market or data mart or market 22. As will be discussed in greater detail below, database or data mart 22 is considered to include some data processing capability for operating the memory structure contained therein similarly to a content-addressable storage (e.g. to be able to access data by VIN and trip number) and to generate metadata that describes various statistics in regard to the data stored.

The Triptogram module contains programmable logic such as a processor to carry out both an ongoing process 24 and a batch process 26. The ongoing process 24 is essentially the reception of reporting data and transfer to storage as staging data 28; thus forming trip data 28' for individual vehicles in substantially real time (in at least the virtual sense because rows of data corresponding to individual trips may then be accessed from memory based on VIN and trip number although the rows of data need not be physically sorted, as stored, into individual trips). These functions are preferably performed based on a configurable time frame parameter. The configurable time frame parameter accommodates the opportunities for data transfer to a landed facility (e.g. in real time or in a batch process at fixed intervals or during periods of low computer utilization) and/or, when the Triptogram processing is performed in the vehicle and only the resulting Triptogram or exceptional trip data transmitted, at the conclusion of one or more trips. Batch processes are intended to create Triptograms from all raw data of valid trips that have not previously been converted to Triptograms. Otherwise, Triptograms are preferably created as data identifiable as a trip arrives at a fixed facility.

Batch process 26 comprises the initial, one-time loading of reporting data into the Triptogram database for a given trip once the trip is determined to be complete, such as upon the vehicle engine being stopped. The batch process essentially determines whether a given trip is a valid trip or an exceptional trip. As alluded to above, a valid trip is a trip during which the location of the vehicle is significantly changed between the start and end of the trip and/or some parameters of interest have significant non-zero values. As alluded to above, and invalid or exceptional trip is a trip where the vehicle may be activated (e.g. the engine started) but where the vehicle position does not significantly change. As also alluded to above, a trip may also be truncated at the beginning and terminal portions thereof if only zero valued parameters of interest are reported. Thus, batch process 26 preferably evaluates an entire trip (or a time and/or storage limited portion thereof) to determine if non-zero valued vehicle operating parameters of interest (or significant numbers thereof) are present and outputs one of two enabling signals that determines further processing of the captured real-time data that will be carried out.

That is, if a significant amount of non-zero valued vehicle operating parameters of interest are present, the trip is determined to be a valid trip and processing to summarize the captured real-time data as a Triptogram is carried out by counting the numbers of each parameter of interest (e.g. speed, longitudinal acceleration/deceleration, lateral acceleration, steering angle and the like, preferably encoded as discussed above which simplifies the process) in a manner similar to developing metadata for a stored file but which describes a histogram of each parameter of interest and/or correlations between them and stored as Triptogram data 30 in a single data row. In this regard, it should be appreciated that some vehicle operating parameters are of direct actuarial interest to insurers while some correlations of vehicle operating parameters may be of predominant interest. For example, correlation of sharp steering angles with longitudinal speed and/or lateral acceleration can distinguish between sharp cornering and parking maneuvers while steering angles that are not well-correlated with lateral acceleration may be indicative of loss of control of the vehicle or at least operation of the vehicle in particularly adverse conditions. Otherwise, if significant numbers of non-zero values of vehicle operating parameters of interest are not present, the trip is determined to be an invalid or exceptional trip and the captured real time data is stored as exception trip data 32 either without summarization or with deletion of some or all zero-valued vehicle operation parameters. It should be noted in this latter regard that exceptional trips may be of some actuarial interest or value to insurers since they may reflect periods in which the vehicle may be more subject to theft or other loss or damage (e.g. during unattended warm-up) or periods when the vehicle operator may be distracted (e.g. during extended vehicle engine operation at the conclusion of a trip or when the vehicle is stationary for an extended period during a trip, for example, during loading or unloading of the vehicle where accidents may be more likely if the vehicle is not turned off and secured). Therefore, it is considered important to document at least some particulars of invalid or exceptional trips although some captured data can usually be discarded or condensed.

Referring now to FIG. 3, the overall system in accordance with the invention is shown combining the existing data collection architecture of FIG. 1 with the Triptogram architecture of FIG. 2. As described above, the reporting data is transferred to the production environment 16 and stored in the production database 17 therein from which it is transferred to the ongoing process 24 of the Triptogram module 20. Alternatively, the reported data can be directly transferred to the ongoing process 24. In either case, the reported data is collected in the staging data partition 28 of the Triptogram database 23. In the preferred data path in which the reporting data is transferred to and collected in the production database 17, the reporting data is propagated in real time to the ongoing process 24 to be processed as discussed above while collected data is transferred periodically as a one-time initial load (for a given trip) to batch process 26. The batch processing 26 that provides for summarization as a histogram representing vehicle operating conditions during a single trip (or period of time) is achieved by simply counting the reporting data values of each variable parameter represented in each reporting for a given vehicle during a given trip. As discussed above, the Triptogram data summarization is preferably performed during transfer from the staging data partition 28 of the Triptogram database to the Triptogram data partition 30 (either within the metadata development processing of the database to perform counting of particular operational parameter values or in external processing; both of which are collectively indicated in FIG. 3 by the data flow 31 and valid trip processing 34 extending outside the Triptogram database 23 but within the Triptogram data mart or market 22) or, alternatively, within batch process 26, since, in any case, counting of respective values of operating parameters is a simple and rapidly executed process requiring only minimal processing power, and valid trips transferred as one row of data describing a histogram of reporting data values to the Triptogram partition 30 if the data meets valid trip rules. This processing can be performed within the vehicle and could provide the additional advantage of reducing the frequency and duration of transmissions from the vehicle for archival storage. The data thus summarized in a Triptogram can thereafter, be rapidly accessed and displayed in response to a query, presented in, for example, structured query language (SQL) in a known manner which is otherwise unimportant to the practice of the invention, as depicted at 35, with or without further processing which may or may not include developing correlations between two or more operating parameters of interest and/or evaluation of a plurality of individual trips and/or vehicles. If the valid trip rules are not met, the reported data (but not in a histogram-type summary) is transferred to the exception trip partition 32 of the Triptogram data base 23 from which it can be accessed at will.

As alluded to above, the reported, captured data can be encoded in a preferred manner which provides data of relatively short length in bits that can fully represent a wide range of operating condition parameter values at any desired resolution or accuracy. It should be understood that the assumptions made in the following example are currently preferred and are clearly sufficient for the preferred application of the invention to determining rates/premiums for usage based insurance but may be changed to provide any desired or sufficient resolution or accuracy and/or range of variable parameter values to be reported for that or any other application of the invention.

For example, the shortest zero-to-sixty miles per hour time reported for any production automobile at the present time is 1.97 seconds. This provides an upper bound on the positive change in speed during one second to be sixty miles per hour which in nearly double the largest speed change currently possible. It is also assumed that an insurer would not wish to insure a vehicle and/or operator that would operate a vehicle in excess of one hundred miles per hour as presenting an excessive risk of liability. (Therefore, determination of a usage based insurance rate/premium would be moot and unnecessary since no such insurance would be issued at all.) This places a bound on negative change in vehicle speed during one second that is to be reported at one hundred miles per hour (which would correspond to the vehicle traveling one hundred miles per hour being stopped by collision with an obstruction). This assumption also places an upper bound on speed to be reported of one hundred miles per hour. If the desired resolution or accuracy for speed and positive and negative longitudinal acceleration is 0.1 miles per hour (e.g. far more accurate than the speed variation that can be achieved by so-called cruise control features on automobiles) the reported value of the longitudinal acceleration will be one of 1601 possible reportable values (−100 to +60 by increments of 0.1) and the reported value of speed will be one of 1001 possible reportable values (0-100 by increments of 0.1). Thus, only 2602 data values are sufficient to express all possible combinations of speed and longitudinal acceleration with the assumed degree of resolution. The number of values optionally required to report other values for measured parameters are very much smaller. For example, racing cars are seldom able to reach a lateral acceleration of twice the force of gravity. Therefore, only 41 values would be required to report positive and negative accelerations with a resolution of 0.1 G (e.g. 2×10 increments×2 for positive and negative plus 1 for zero acceleration). Likewise, steering angle cannot realistically exceed 90° to the left or right and thus 181 values of that variable parameter would be sufficient to report all possible steering angles with a resolution of 1°. It should be noted that the identifiers (e.g. names or numbers) assigned to respective parameter values may be arbitrary and need not be defined in advance, a numbering of the values represented in ascending order of magnitude of each parameter simplifies processing (e.g. counting and representing a histogram of the resulting counts) and is preferred for that reason. Other variable parameters of likely interest are generally quite short for a given vehicle and may, in some cases, be omitted. That is, VIN and trip number need not be specially encoded and other variable data that is preferred might be start and stop time stamps and, if GPS data is available or made available, start and stop latitude and longitude need only be provided in the first and last reporting data transmissions and then only as confirmation (e.g. to avoid accumulation of position error or time error due to some data storage latency) of information which can be reconstructed from other variable parameter values.

It should be noted that VIN and trip number variable values serve only to associate reporting data with a particular vehicle and a particular trip and that for a particular vehicle and trip only 2602 values are sufficient to represent all possible values of two (speed and longitudinal acceleration) variable parameters and the assumed resolution and, optionally, 222 (181+41) additional values are required to represent all possible reportable values of two further variable parameters (lateral acceleration and steering angle) at the assumed resolution. Such encoding can be provided at little additional cost in future reporting devices 14 and existing reporting devices 14 can be accommodated by providing code conversion to such a code at similarly small cost in production environments 16 and/or Triptogram modules 20. Therefore, a histogram for each variable parameter can be developed by simply counting each discrete value of each parameter appearing in the reported data values for a given trip by a given vehicle.

Figure 4A:
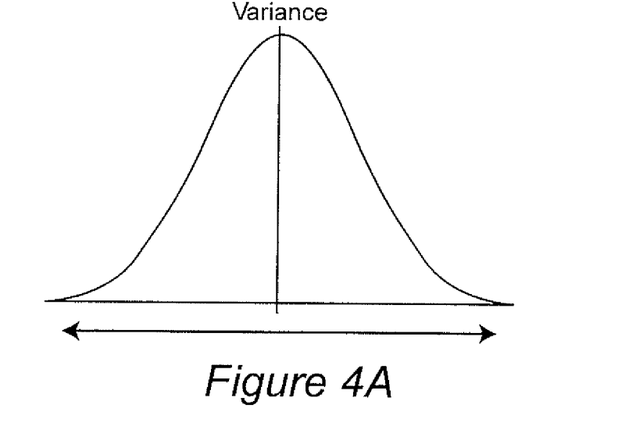
Figure 4B:
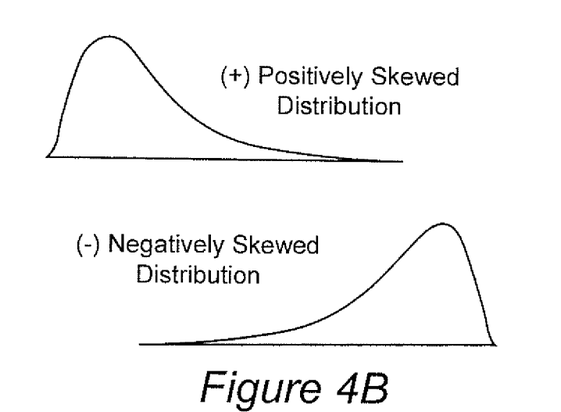
Figure 4C:
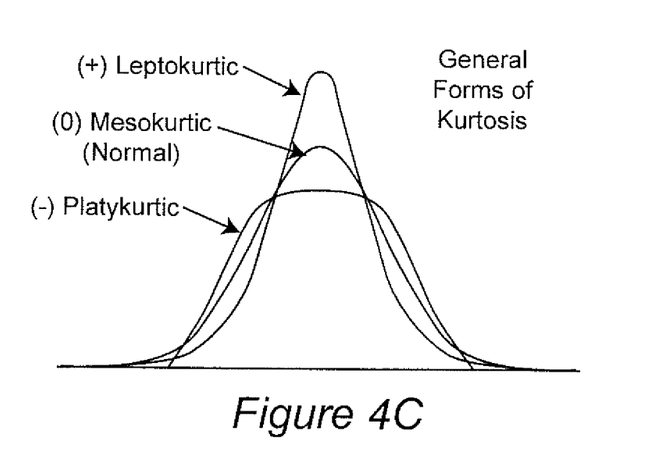

Therefore, a Triptogram in accordance with the invention can be easily accumulated from the reporting data through rapidly executed processing and the result represented in a single row of data corresponding to a given trip. Moreover, quantitative measures of the histogram can be easily and quickly computed or derived from the histogram/Triptogram that are directly relevant to setting of rates/premiums for usage based insurance (or in other applications or reporting data identifiers). For example, frequency and duration of trips can be determined from start and stop time stamps and locations and routes can be inferred from start and stop locations if not directly tracked from GPS data, if included. So-called "squigglies" alluded to above generally correspond to the overall shape of the histogram for each variable parameter that could be evaluated to an adequate degree simply by inspection. Specifically, the variance of the parameter corresponds to the spread of the histogram as illustrated in FIG. 4A. The skewness of the histogram, which is a measure of the symmetry of the histograms as illustrated in FIG. 4B will correspond to general driving habits and conditions in regard to speed, change of speed and frequency of turns and sharpness of turns and consistency with steering angle. For example, a positively skewed speed histogram (so-called because of the longer "tail" of histogram values in a positive direction) tends to indicate consistent operation at prudent speeds while a negatively skewed acceleration histogram tends to indicate aggressive driving. Kurtosis, as illustrated in FIG. 4C is a measure of consistency of driving behavior. A highly peaked (leptokurtic) histogram of any variable parameter tends to indicate a high level consistency of vehicle operation greater than that of a mesokurtic, normal histogram shape while a flattened or platykurtic shape tends to indicate inconsistent vehicle operation (e.g. by a given operator or between a number of possible operators of the vehicle) and, when of more nearly square shape or doubly peaked, may even indicate a degree of tendency toward so-called "road rage" of a single driver or gross differences in behaviors between a plurality of potential operators. Insurers presumably prefer a narrow spread, positive skew and more nearly leptokurtic cumulative histogram shape over a significant number of trips.

The effectiveness of the invention to support setting of usage based insurance rates/premiums has been demonstrated by construction of a prototype processor using Microsoft Access™ and an Intel™ core2 Duo CPU T7500 operating at 2.20 GHZ. and having 1.98 GB of RAM. Prototype data included one million rows of data including VIN, trip ID, time and speed parameters representing five hundred sixty-three trips. For comparison, acceleration data values were not included in the prototype data but were derived from the speed data. Under these conditions, the CPU was able to build five hundred sixty-three speed histograms in 1.33 minutes and to build five hundred sixty-three acceleration/change in speed histograms in 6.33 minutes. While there is little, if any, improvement in processing speed for initial processing of the reporting data to develop Triptograms as compared with processing of any given query in regard to the same number of rows of captured data, processing time per report of reporting data can easily be kept below reporting data input rate while the reduction in terms of rows, is dramatic: a reduction factor of about one thousand for trips averaging about ten minutes in duration and greater for trips of greater duration since, in a Triptogram summary, the data is reduced to one row per trip as compared with one row per second of trip duration. Therefore, since storage of reporting data is only provided temporarily for staging for processing in accordance with the invention and for exceptional trips, the storage requirements are dramatically reduced. Fewer rows of stored data would be generated in a year using the invention than would be generated in a day in the absence of the invention. Since both the hardware and software for this prototype have substantial limitations, there should be even more dramatic improvements in processing time in a more nearly optimal processing environment. Thus additional processing to evaluate usage of a given vehicle by its likely operators would be improved by a comparable if not greater factor.

More importantly, processing in accordance with the invention to provide Triptograms that summarize data for individual trips in an analytically meaningful way allow later, possibly more specific inquiries to be performed in far less time than could be accomplished in the absence of the invention because of the large number of rows of captured data and the number of memory accesses required for processing of any query since the processing time for any inquiry is dominated by the number of required memory accesses. That is, since the invention provides for a reduction of the number of rows of data generated in each trip made by each vehicle to a single row of data, the processing time for any given inquiry based on Triptogram summaries rather than on raw data as captured is reduced by a factor comparable to the reduction of the number of rows of data for an average trip by the vehicle; generally a factor of one thousand or more, assuming an average trip length of ten minutes or more. Similarly, while the processing time for generating Triptograms is also dominated by the number of rows of captured data per trip, such processing may be performed for relatively smaller numbers of trips made in a given period of time (e.g. one day) and the processing performed during periods of low processing demand on available processors; allowing other inquiries and analyses to be performed much more simply and in far less time based upon the captured data as summarized in an analytically meaningful way in Triptograms, generally using well-known and simply and quickly executed statistical techniques and, most importantly, requiring a greatly reduced number of (e.g. content addressable) memory accesses.

In view of the foregoing, it is readily seen that the processing of continuously captured reporting information and processing thereof within a reasonable period of time is entirely feasible in accordance with the method and apparatus in accordance with the invention while an extremely high degree of lossless data reduction in terms of rows of data and speed of processing of captured data for evaluation to support, for example, setting of rates/premiums for usage based insurance is greatly simplified and accelerated. Wide dynamic ranges of operating conditions can be represented in relatively few bits representing values of variable parameters that can be processed into histograms representing vehicle operation during a given trip by simply counting each unique parameter value represented in respective reporting data. The histogram/Triptogram for a given trip can then be represented by a single row of data which can be rapidly accessed and further processed, generally in a simple manner, such as by aggregating histograms for a substantial number of trips and resulting in quantitative information in a form which can be easily evaluated to characterize operation of a vehicle or any other system while allowing straightforward concurrent monitoring of a large number of vehicles or other systems and preserving indicators of erratic operation. The invention can also accommodate any desired granularity and satisfy any requirement in regard to currency of data and can accommodate any required degree of resolution or accuracy within present vehicle operation data collection infrastructure.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of summarizing data, said method comprising steps of
   capturing data pertaining to reports of at least one operating condition of at least one system during a period of operation, said at least one operating condition having a dynamic range and said reports being represented in respective rows of data,
   assigning a value to each possible reportable value of at least one operating parameter of said at least one operating condition of said at least one system, whereby said at least one operating parameter are variable operating parameters of a vehicle and the value assigned is a discrete value selected from a list of all possible values,
   counting a number of occurrences of each said value in the captured data to produce counts of respective values for said at least one operating parameter of said at least one operating condition,
   forming a histogram of said counts, and
   representing said histogram in fewer rows of data than said rows of data of said reports.

2. The method as recited in claim 1, wherein said reports are captured periodic samples of respective operating parameters.

3. The method as recited in claim 1, wherein said histogram is represented in a single row of data.

4. The method as recited in claim 1, wherein said operating parameters of a vehicle include speed of a vehicle.

5. The method as recited in claim 4, wherein said operating parameters of a vehicle further include measured longitudinal acceleration.

6. The method as recited in claim 4, wherein said operating parameters of a vehicle further include values of longitudinal acceleration computed from sequential values of said speed of said vehicle.

7. The method as recited in claim 6, wherein said operating parameters of a vehicle further include at least one of lateral acceleration and steering angle.

8. The method as recited in claim 1, wherein said operating parameters of a vehicle include at least one of lateral acceleration and steering angle.

9. The method as recited in claim 1, including a further step of evaluating said histogram in regard to at least one of variance, skew and kurtosis.

10. The method as recited in claim 1, further including a step of correlating values of at least two operating conditions.

11. The method as recited in claim 1, including the further step of determining likelihood of an event from said histogram.

12. The method as recited in claim 11, including the further step of determining a likely cost of said event.

13. The method as recited in claim 11, including the further step of determining an insurance premium from said histogram.

14. Apparatus for summarizing data including
at least one sensor to capture values of at least one operating parameter of at least one operating condition of a system as respective rows of data, said at least one operating condition having a dynamic range and whereby said at least one operating parameter of said system are variable operating parameters of a vehicle;
a memory to store said values of at least one operating parameter over a period of operation of said system;
a processor for evaluating said values stored in said memory to determine if the period of operation of said system is valid or exceptional and, if said values for said period of operation are determined to be valid,
assigning a discrete value selected from a list of all possible values to each captured value and
counting a number of occurrences of each said discrete value assigned to each said captured value to produce counts of respective values for said at least one operating parameter during said period of operation; and
storage to store results of said counting by said processor as fewer rows of data than said respective rows of data.

15. The apparatus as recited in claim 14, further including further storage to store some particulars of a period of operation of said system determined to be exceptional.

16. The apparatus as recited in claim 14, wherein said results of said counting are stored as a single row of data representing a histogram.

17. The apparatus as recited in claim 14, further including a processor to access and process said results of said counting in response to a query.

18. The apparatus as recited in claim 17, further including presenting a response to said query in the form of a histogram exhibiting variance, skew and kurtosis.

19. The apparatus as recited in claim 14, wherein said system comprises a plurality of vehicles and said at least one operating parameter comprises at least one of speed, longitudinal acceleration, lateral acceleration and steering angle.

20. A method of summarizing data, said method comprising steps of
capturing data pertaining to reports of at least one operating condition of at least one system during a period of operation, said at least one operating condition having a dynamic range and said reports being represented in respective rows of data,
assigning a value to each possible reportable value of at least one operating parameter of said at least one operating condition of said at least one system, whereby said at least one operating parameter are variable operating parameters of a vehicle and the value assigned is a discrete value selected from a list of all possible values,
configuring a data processor to count a number of occurrences of each said value in said captured data to produce counts of respective values for said at least one operating parameter of said at least one operating condition, and
configuring a data processor to form a histogram of said counts, and to represent said histogram in fewer rows of data than said rows of data of said reports.

* * * * *